(12) United States Patent
Langhammer

(10) Patent No.: US 12,182,534 B2
(45) Date of Patent: Dec. 31, 2024

(54) HIGH PRECISION DECOMPOSABLE DSP ENTITY

(71) Applicant: Intel Corporation, Santa Clara, CA (US)

(72) Inventor: Martin Langhammer, Alderbury (GB)

(73) Assignee: Intel Corporation, Santa Clara, CA (US)

( * ) Notice: Subject to any disclaimer, the term of this patent is extended or adjusted under 35 U.S.C. 154(b) by 678 days.

(21) Appl. No.: 17/359,036

(22) Filed: Jun. 25, 2021

(65) Prior Publication Data
US 2021/0326116 A1 Oct. 21, 2021

(51) Int. Cl.
*G06F 7/544* (2006.01)
*G06F 8/41* (2018.01)

(52) U.S. Cl.
CPC ............ *G06F 7/5443* (2013.01); *G06F 8/443* (2013.01)

(58) Field of Classification Search
CPC .................................................... G06F 7/5443
See application file for complete search history.

(56) References Cited

U.S. PATENT DOCUMENTS

| 5,974,435 A | * | 10/1999 | Abbott | G06F 7/5324 |
| | | | | 708/523 |
| 11,768,661 B2 | * | 9/2023 | Yazdanshenas | G06F 7/57 |
| | | | | 708/190 |
| 2002/0129075 A1 | * | 9/2002 | Park | G06F 7/485 |
| | | | | 708/497 |

* cited by examiner

*Primary Examiner* — Michael D. Yaary
(74) *Attorney, Agent, or Firm* — Fletcher Yoder, P.C.

(57) ABSTRACT

A digital signal processing (DSP) block includes a plurality of multipliers and a summation block separate from the plurality of multipliers. The DSP block is configurable to perform a first multiplication operation to determine a first product of a first floating-point value and a second floating-point value using only a first multiplier of the plurality of multipliers. Additionally, the DSP block is configurable to perform a second multiplication operation between a third floating-point value and a fourth floating-point value by receiving, at each of the plurality of multipliers, two integer values generated from the third floating-point value and the fourth floating-point value, generating, via the plurality of multipliers, a plurality of subproducts by multiplying, at each of the multipliers, the two integer values, and generating a second product of the second multiplication operation by adding, via the summation block, the plurality of subproducts.

20 Claims, 10 Drawing Sheets

HIGH PRECISION DECOMPOSABLE DSP ENTITY

BACKGROUND

The present disclosure relates generally to integrated circuit (IC) devices such as programmable logic devices (PLDs). More particularly, the present disclosure relates to a digital signal processing (DSP) block that may be included on an integrated circuit device as well as applications that can be performed utilizing the processing block.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it may be understood that these statements are to be read in this light, and not as admissions of prior art.

Integrated circuit devices may be utilized for a variety of purposes or applications, such as digital signal processing and machine learning. Indeed, machine learning and artificial intelligence applications have become ever more prevalent. Programmable logic devices may be utilized to perform these functions, for example, using particular circuitry (e.g., processing blocks). In some cases, particular circuitry that is effective for digital signal processing may not be well suited for machine learning, while particular circuitry for machine learning may not be well suited for digital signal processing.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As machine leaning and artificial intelligence applications have become ever more prevalent, there is a growing desire for circuitry to perform calculations utilized in machine-leaning and artificial intelligence applications that is also able to be used for digital signal processing applications. The present systems and techniques relate to embodiments of a digital signal processing (DSP) block that may be utilized for a variety of applications including, but not limited to, artificial intelligence (AI), digital signal processing, and cryptography. In general, a DSP block is a type of circuitry that is used in integrated circuit devices, such as field programmable gate arrays (FPGAs), to perform multiply, accumulate, and addition operations. The DSP block described herein may perform fixed-point and floating-point on several precisions and types of values. For example, as described below, the DSP block may perform floating-point multiplication involving double precision values (e.g., double precision values as described in Institute of Electrical and Electronic Engineers (IEEE) Standard 754-1269, entitled "IEEE Standard for Floating-Point Arithmetic"). Double precision floating-point value may include one sign bit, eleven exponent bits, and fifty-two (explicit) mantissa (also known as significand) bits in which the base is two. More specifically, the mantissa may have fifty-three bits in total, with fifty-two of the bits being explicitly stored and one of the bits having an implied value (e.g., a "1"). This format can also be referred to as a binary64 format or FP64 format.

Figure 1:
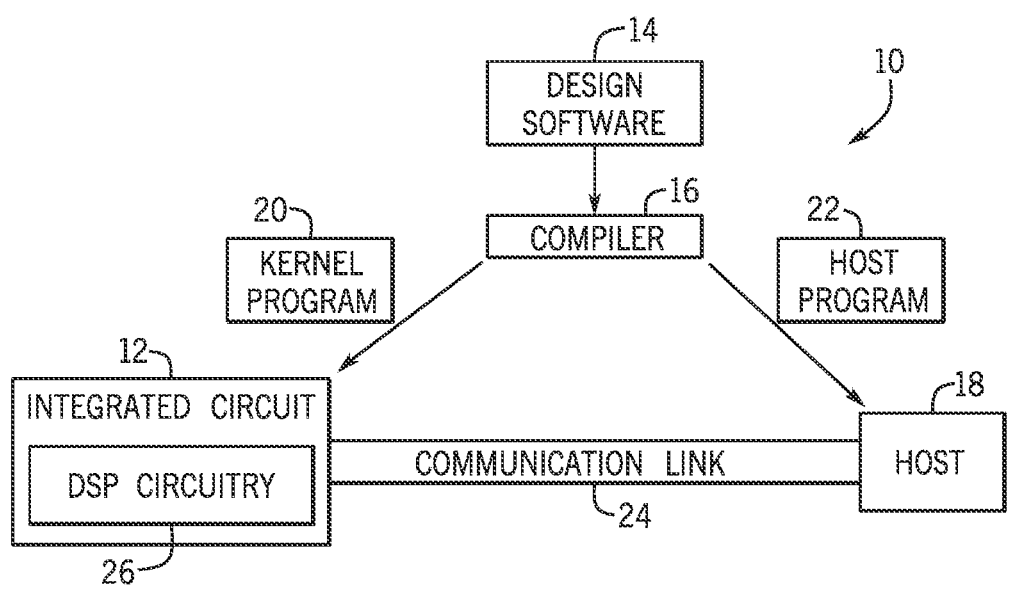
FIG. 1 is a block diagram of a system that may implement arithmetic operations using a digital signal processing (DSP) block, in accordance with an embodiment of the present disclosure.

With the foregoing in mind, FIG. 1 illustrates a block diagram of a system 10 that may perform fixed-point and floating-point multiplication as described herein. A designer may desire to implement functionality or an application involving fixed-point multiplication, floating-point multiplication, or both on an integrated circuit device 12 (such as a field programmable gate array (FPGA)). The designer may specify a high-level program to be implemented, such as an OpenCL program, which may enable the designer to more efficiently and easily provide programming instructions to configure a set of programmable logic cells for the integrated circuit device 12 without requiring specific knowledge of low-level hardware description languages (e.g., Verilog or VHDL). For example, because OpenCL is quite similar to other high-level programming languages, such as C++, designers of programmable logic familiar with such programming languages may have a reduced learning curve than designers that may have to learn unfamiliar low-level hardware description languages to implement new functionalities in the integrated circuit device 12.

Designers may implement their high-level designs using design software 14. The design software 14 may use a compiler 16 to convert the high-level program into a lower-level description. The design software 14 may also be used to optimize and/or increase efficiency in the design. The compiler 16 may provide machine-readable instructions representative of the high-level program to a host 18 and the integrated circuit device 12. The host 18 may receive a host program 22, which may be implemented by kernel programs 20. To implement the host program 22, the host 18 may communicate instructions from the host program 22 to the integrated circuit device 12 via a communications link 24, which may be, for example, direct memory access (DMA) communications or peripheral component interconnect express (PCIe) communications. In some embodiments, the kernel programs 20 and the host 18 may enable configuration of one or more DSP blocks 26 on the integrated circuit device 12. The DSP block 26 may include circuitry to perform, for example, fixed-point and floating-point multiplication. The integrated circuit device 12 may include many (e.g., hundreds or thousands) of the DSP blocks 26. Additionally, DSP blocks 26 may be communicatively coupled to another such that data outputted from one DSP block 26 may be provided to other DSP blocks 26.

While the techniques above discussion described to the application of a high-level program, in some embodiments, the designer may use the design software 14 to generate and/or to specify a low-level program, such as the low-level hardware description languages described above. Further, in some embodiments, the system 10 may be implemented without a separate host program 22. Moreover, in some embodiments, the techniques described herein may be implemented in circuitry as a non-programmable circuit design. Thus, embodiments described herein are intended to be illustrative and not limiting.

Figure 2:
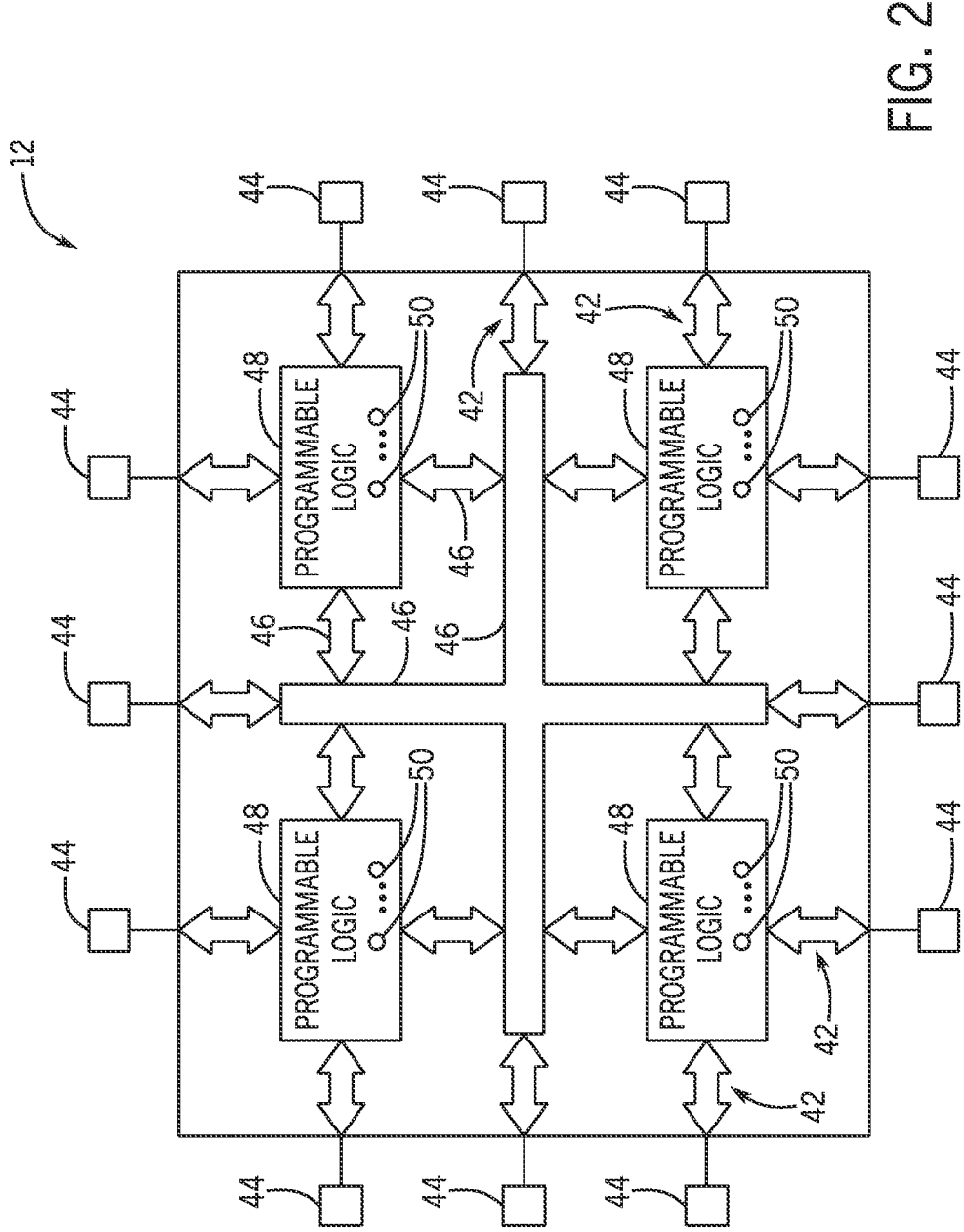
FIG. 2 is a block diagram of the integrated circuit device of FIG. 1, in accordance with an embodiment of the present disclosure.

Turning now to a more detailed discussion of the integrated circuit device 12, FIG. 2 illustrates a block diagram of the integrated circuit device 12 that may be a programmable logic device, such as an FPGA. Further, it should be understood that the integrated circuit device 12 may be any other suitable type of programmable logic device (e.g., an application-specific integrated circuit and/or application-specific standard product). As shown, the integrated circuit device 12 may have input/output circuitry 42 for driving signals off device and for receiving signals from other devices via input/output pins 44. Interconnection resources 46, such as global and local vertical and horizontal conductive lines and buses, may be used to route signals on integrated circuit device 12. Additionally, interconnection resources 46 may include fixed interconnects (conductive lines) and programmable interconnects (i.e., programmable connections between respective fixed interconnects). Programmable logic 48 may include combinational and sequential logic circuitry. For example, programmable logic 48 may include look-up tables, registers, and multiplexers. In various embodiments, the programmable logic 48 may be configurable to perform a custom logic function. The programmable interconnects associated with interconnection resources may be considered to be a part of programmable logic 48. The programmable logic 48 may include multiple various types of programmable logic 48 of different tiers of programmability. For example, the programmable logic 48 may include various mathematical logic units, such as an arithmetic logic unit (ALU) or configurable logic block (CLB) that may be configurable to perform various mathematical functions (e.g., floating-point multiplication calculations). Integrated circuits, such as integrated circuit device 12, may contain programmable elements 50 within the programmable logic 48. For example, a designer (e.g., a customer) may program (e.g., configure) the programmable logic 48 to perform one or more desired functions (e.g., perform floating-point arithmetic).

Figure 3:
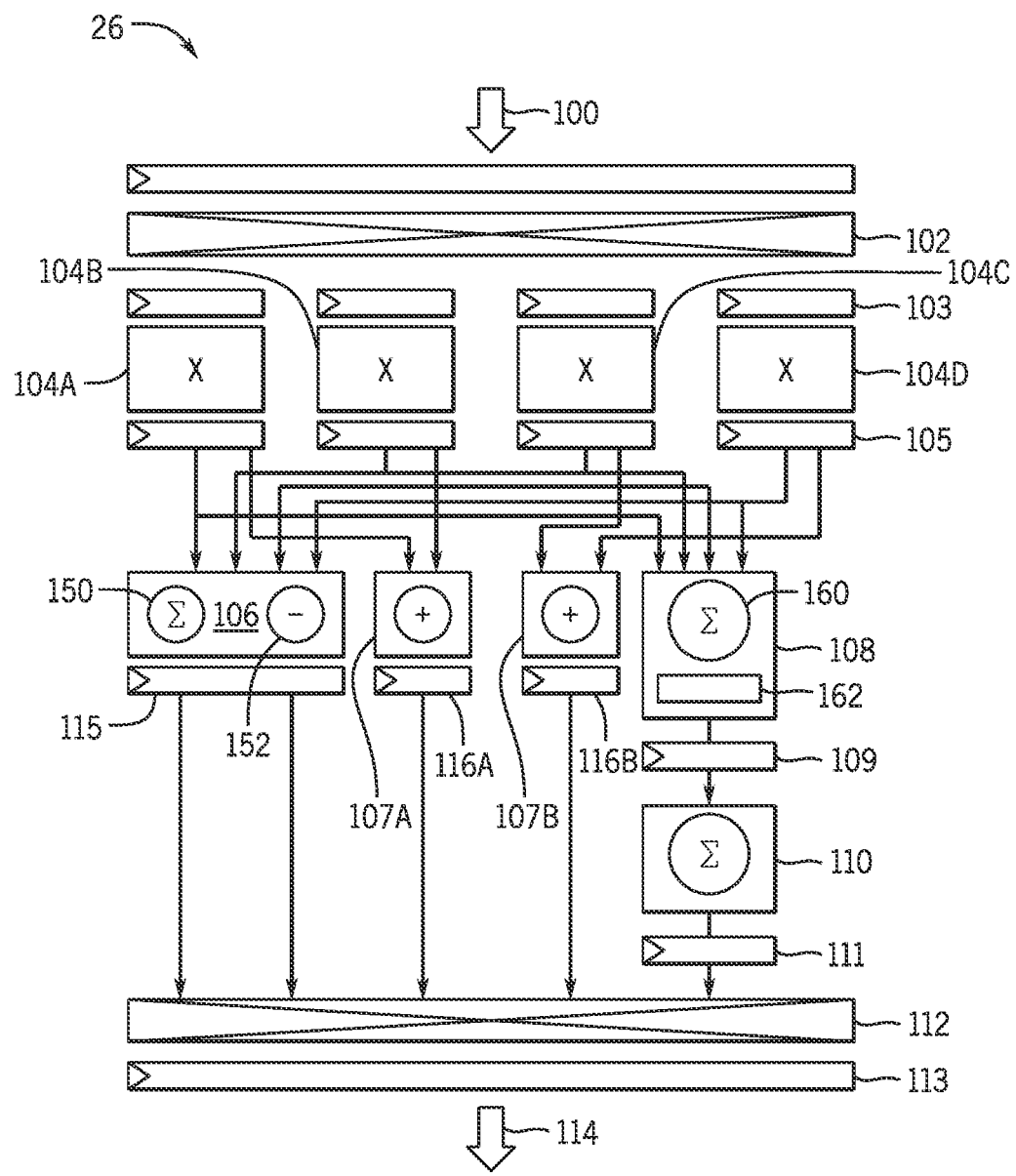
FIG. 3 is a block diagram of the digital signal processing (DSP) block of FIG. 1, in accordance with an embodiment of the present disclosure.

Keeping the foregoing in mind, FIG. 3 is a block diagram of the DSP block 26 in accordance with an embodiment of the present disclosure. The DSP block 26 may be used for a variety of applications and to perform many different operations associated with the applications, such as multiplication and addition. For example, multiplication operations involving double precision values (e.g., FP64 values) or fixed-point (e.g., integer) values may be performed using the DSP block 26. As illustrated, the DSP block 26 includes an input 100, register block 101, a multiplexer network 102, register blocks 103, multipliers 104 (e.g., multiplier 104A, multiplier 104B, multiplier 104C, multiplier 104D) register blocks 105, an integer combining block 106, (floating-point) adders 107 (e.g., adder 107A and adder 107B), a summation block 108, a register block 109, a summation block 110, a register block 111, a multiplexer network 112, register block 113, and an output 114.

The DSP block 26 may receive inputs from routing fabric at the input 100. In one embodiment, the input may include 128 data wires to support double precision floating-point (e.g., FP64) multiplication or addition. In other words, in such an embodiment, the DSP block 26 may receive up to 128 bits of data (e.g., per clock cycle) at the input 100. The received data may include one or more fixed-point or floating-point values. Additionally, it should be appreciated that while 128 input routing wires may be used when performing FP64 calculations (e.g., FP64×FP64 multiplication operations), additional input routing wires may be provided for dynamic control, to access more arithmetic components independently, or both.

The DSP bock 26 may further include one or more pipeline stages, which are represented by the register blocks 101, 103, 105, 109, 111, 113 as well as register block 115 and register blocks 116 (e.g., register block 116A and register block 116B). As discussed below, as data is received or output by various components of the DSP block 26, the data may be stored in the register blocks 101, 103, 105, 109, 111, 113, 115, 116. While the one or more registers (e.g., one or more of register blocks 101, 103, 105, 109, 111, 113, 115, 116) may be located at different points in the data path, the one or more registers may be selectively bypassable. In other embodiments, the position, function, or both of the register blocks 101, 103, 105, 109, 111, 113, 115, 116 (or a portion thereof) may be fixed. The register blocks 101, 103, 105, 109, 111, 113, 115, 116 may support multiple modes (e.g., floating-point and fixed-point modes) and precisions including, but not limited to, FP64, FP32 (e.g., single precision floating-point values), INT27 (e.g., a fixed-point value having twenty-seven bits) and INT16 (e.g., a fixed-point value having sixteen bits).

As data (e.g., values) is received by the DSP block, the data may be stored in the register block 101. The multiplexer network 102 is located downstream of the register block 101 and may receive one or more values (e.g., two values to be multiplied or portions thereof) outputs from the register block 101 (or, in some embodiments, directly from the input 100). The multiplexer network 102 may route the received data (e.g., up to 128 bits of data) to the various arithmetic blocks located downstream of the multiplexer network 102. For instance, in some embodiments, the multiplexer network 102 may route the outputs of the register block 101 to the registers 103 located directly upstream of multipliers 104. More specifically, the multiplexer network 102 may output a data stream having up to 128 bits of data to the respective registers 103 such that the correct arithmetic may be done at the multipliers 104. In some instances, the output from the multiplexer network 102 may bypass the registers 103, the multipliers 104, and registers 105 to directly access other arithmetic components of the DSP block 26 such as, but not limited to, the summation block 110, which may be used to perform addition involving double precision floating-point values (or less precise floating-point values).

Each of the multipliers 104 is communicatively coupled to a corresponding one of each of the registers 103 and the registers 105 and may be constructed around a single INT28 multiplier (e.g., multiplier circuitry capable of performing signed 28-bit×28-bit multiplication). In other words, each of the four multipliers 104 may be a multiplier that can perform signed (or unsigned or signed×unsigned) multiplication involving two values that include twenty-eight (or fewer) bits. In some instances, the INT28 multiplier may be replaced by a 27×27 multiplier having selectable signed and unsigned modes. The multipliers 104 may output both integer (i.e., fixed point) and floating-point multiplier values to other components of the DSP block 26. For example, when performing fixed-point multiplication, the output of each of the multipliers 104 may be a subproduct (e.g., partial product) of a multiplication operation. Somewhat similarly, when performing floating-point multiplication, the output of each of the multipliers 104 may include a subproduct associated with the mantissa (also known as significand) bits as well as bits corresponding to the exponent portion of a floating-point value. The multipliers 104 may output the integer and the floating-point multiplier values to the registers 105.

Figure 4:
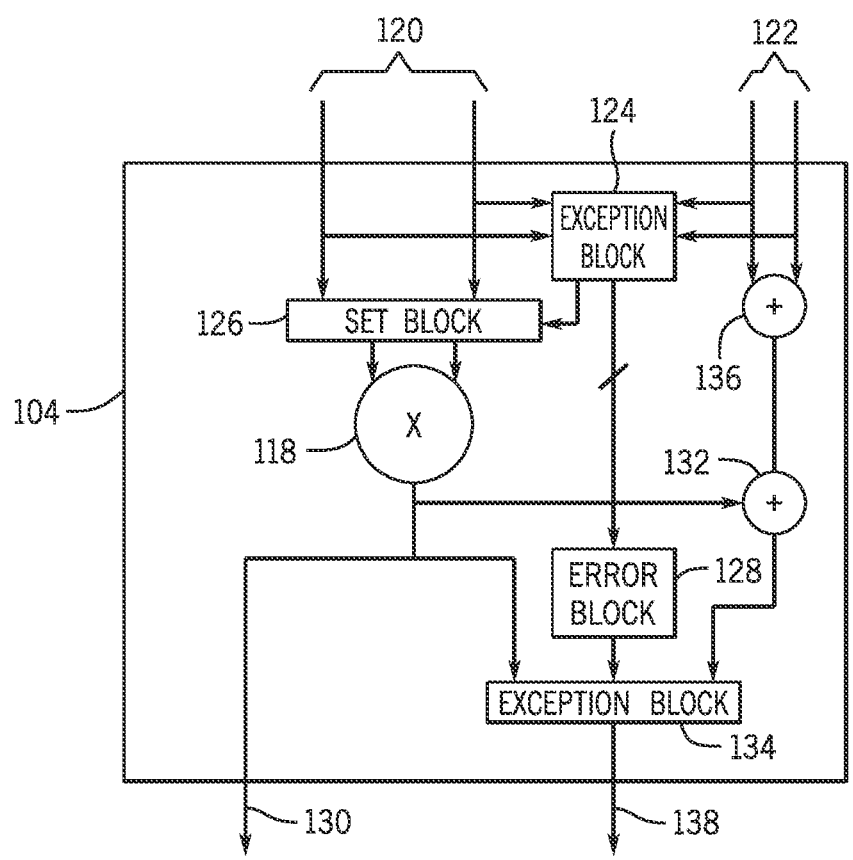
FIG. 4 is a block diagram of a multiplier within the DSP block of FIG. 3, in accordance with an embodiment of the present disclosure.

To facilitate further discussion of the multipliers 104, FIG. 4 illustrates a multiplier 104, which may be any of the multipliers 104A, 104B, 104C, 104D of FIG. 3. It should be noted that the multipliers 104 each include a core multiplier 118, which may be the INT28 multiplier discussed above. The multiplier 104 may receive inputs 120 and inputs 122 from the multiplexer network 102 or the register blocks 103. In particular, the inputs 120 may include bits of integer values or mantissa bits of floating-point values to be multiplied, and the inputs 122 may include the exponent bits of two floating-point values that will be multiplied (e.g., exponent bits of single precision floating-point values). For example, when performing a single precision floating-point multiplication involving a first FP32 value and a second FP32 value, the multiplexer network 102 may route (e.g., directly to the multipliers 104, to the registers 103, or some combination thereof) the mantissa bits and exponent bits of each of the FP32 values to the multipliers 104 to perform the multiplication operation. For instance, referring briefly back to FIG. 3, the multiplexer network 102 may route (e.g., directly to the multipliers 104, to the registers 103, or some combination thereof) the mantissa bits and the exponent bits of both FP32 values to a single multiplier 104.

As another example, when performing a double precision floating-point multiplication operation involving a first FP64 value and a second FP64 value, the multiplexer network 102 may route (e.g., directly to the multipliers 104, to the registers 103, or some combination thereof) mantissa bits of each of the FP64 values to the multipliers 104 to perform portions of the FP64×FP64 multiplication operation. More specifically, the multiplexer network 102 may route the upper halves of the mantissa bits (e.g., the twenty-seven most significant mantissa bits) of the first and second FP64 values to the multiplier 104A. The multiplexer network 102 may route the upper half of the mantissa bits of the first FP64 value and the lower half of the mantissa bits (e.g., the twenty-six least significant explicit mantissa bits) of the second FP64 value to the multiplier 104B. The multiplexer network 102 may route the upper half of the mantissa bits of the second FP64 value and the lower half of the mantissa bits of the first FP64 value to the multiplier 104C. Furthermore, the multiplexer network 102 may route the lower halves of the first and second FP64 values to the multiplier 104D. Accordingly, when performing single precision floating multiplication, mantissa bits and exponent bits may be provided to the multipliers 104. Additionally, when performing double precision floating-point multiplication, the multipliers 104 may not receive the exponent bits of the double-precision floating point values being multiplied. Before returning to the discussion of FIG. 4, it should be noted that while examples for the number of bits in the upper half and lower half of FP64 values are provided above, these example are not exhaustive. That is, in other embodiments, the mantissa bits of floating-point values may be split in another manner and still be referred to as "upper" and "lower" halves or portions of the mantissa bits. For example, the upper half of the mantissa bits may include the twenty-six most significant mantissa bits, and the lower half of the mantissa bits may include the twenty-seven least significant mantissa bits. Additionally, it should be noted that the sign bit of a floating-point value may be included in the upper half (e.g., as the most significant bit) of the mantissa bits routes to the multipliers 104. Furthermore, as noted above, the upper half of the mantissa bits may include a "1" that is implied in a floating-point value.

Returning to FIG. 4, the mantissa bits (or integer bits in the case of fixed-point multiplication) received via the inputs 120 and the exponent bits received via the inputs 122 (e.g., when performing single precision floating-point multiplication) may be input into an input exception block 124. The input exception block 124 may determine whether the received bits include any computational exceptions such as, but not limited to, infinite (INF) valued inputs and/or non-numerical (NaN) inputs based on the data received via the inputs 120, 122. The outputs from the input exception block 124 may be routed to a set block 126, an error block 128, or both. The set block 126, which may also directly receive the bits received via the inputs 120, may set leading 1's when indicated by the outputs from the input exception block 124. In other words, the set block 126 may set a leading "1" for either of the values received via the inputs 120 that will be provided to the core multiplier 118.

The core multiplier 118 may receive outputs from the set block 126 and perform multiplication operations yielding a multiplication result that is the product of mantissa bits of floating-point values being multiplied or, in the case of fixed-point multiplication, the product of two fixed-point values received via the inputs 120. The fixed-point product generated by the core multiplier 118 may be output from the multiplier 104 via output 130. The fixed-point product may be a product generated by performing fixed-point multiplication or, in the case of floating-point multiplication, a product generated by multiplying (mantissa) bits received via the inputs 120). Indeed, as discussed below, when performing double precision floating-point multiplication, the fixed-point output provided via the output 130 may be utilized (e.g., by summation block 108) to generate the product of two double precision floating-point values. Additionally, the output of the core multiplier 118 may be output to an adder 132 and an error block 134, both of which are discussed below in more detail.

Continuing the discussion of FIG. 4, the exponent bits received via the inputs 122 (when performing floating-point multiplication) may be routed to the input exception block 124 and/or an adder 136. The bits received via the inputs 122 may be routed to the adder 136, and any bias (e.g., as determined by the input exception block 124) may be applied by the adder 136. The adder 136 may output a sum and route the sum to the adder 132. The adder 132 may receive the multiplication result output from the core multiplier 118 and increment the exponent (e.g., the sum) received from the adder 136 accordingly. The adders 132, 136 may be any adders suitable for performing addition on exponent bits of FP32 values.

An output exception block 134 may receive outputs from the core multiplier 118, the adder 132, and the error block 128. The error block 128 may determine if there are any exceptions and/or errors based on input exceptions and conditions. The exceptions and/or errors may be applied by the output exception block 134. The output exception block 134 may then output a floating-point value (e.g., a product) via the output 138 of the multiplier 104. More specifically, the value output via the output 138 may be a single precision floating-point value (e.g., an FP32 value) that is generated as the product of a single precision floating-point multiplication operation (e.g., an FP32×FP32 multiplication operation).

In some instances, such as when performing integer multiplication or double precision floating-point operations (e.g., FP64×FP 64 multiplication operations), the floating-point specific components included in the multiplier (e.g., input exception block 124, adders 132, 136, error block 128, and output exception block 134) and operations may be ignored, and the set block 126 may be bypassed. In some embodiments, the floating-point specific components and operations may be zeroed to reduce power consumption of the DSP block 26. For example, when performing integer multiplication or double precision floating-point multiplication, the bits of values to be multiplied may be routed into the multiplier 104 via the inputs 120 and directed into the core multiplier 118, and no input may be provided via the input 122. Additionally, or alternatively, the values received via the inputs 120 may be directed into the input exception block 124 and the core multiplier 118.

Returning to FIG. 3, the fixed-point output of each of the multipliers 104 (i.e., the value output by output 130) may be routed directly to the multiplexer network 112, the integer combining block 106, or the summation block 108. The integer combining block 106 may sum each of the received values together using summation circuitry 150, which may include adders, compressors, or a combination thereof. For example, when performing integer multiplication, each of the four multipliers 104 may output a subproduct via output 130, and the integer combining block 106 may sum all four of the received subproducts together. Additionally, or alternatively, the integer combining block 106 may determine complex results by adding two received results (e.g., outputs from two of the outputs 130 of the multipliers 104) together and subtracting the other two multiplication results (e.g., using subtraction circuitry 152). In some embodiments, the multiplexer network 102 may take four (e.g., twenty-eight bit) values that may include two complex inputs (e.g., (a+bj) and (c+dj)) and route the two complex inputs to the four multipliers 104 in pairs. The pairs may take the form of {ac}, {bd}, {ad}, and {bc}. As mentioned above, the sum of the four multiplier 104 outputs, or the two output values of the complex multiplier, are routed to the multiplexer network 112.

The DSP block 26 may sum products (e.g., FP32 values) generated by the multipliers 104 using the adders 107 (e.g., adders 107A, 107B). More specifically, the adder 107A may receive floating-point values output by the multipliers 104A, 104B and determine a sum. Furthermore, the adder 107B may receive floating-point values output by the multipliers 104C, 104D and determine a sum. The sums generated by the adders 107 may be routed directly to the multiplexer network 112. Furthermore, it should be noted that the adders 107 may be utilized when performing certain floating-point operations. For example, the DSP block 26 may be utilized to sum the products of two FP32×FP32 multiplication operations. In such a case, the two products may be output be two of the multipliers 104 (e.g., multipliers 104A, 104B) and summed by one of the adders 107 (e.g., adder 107A).

Figure 5:
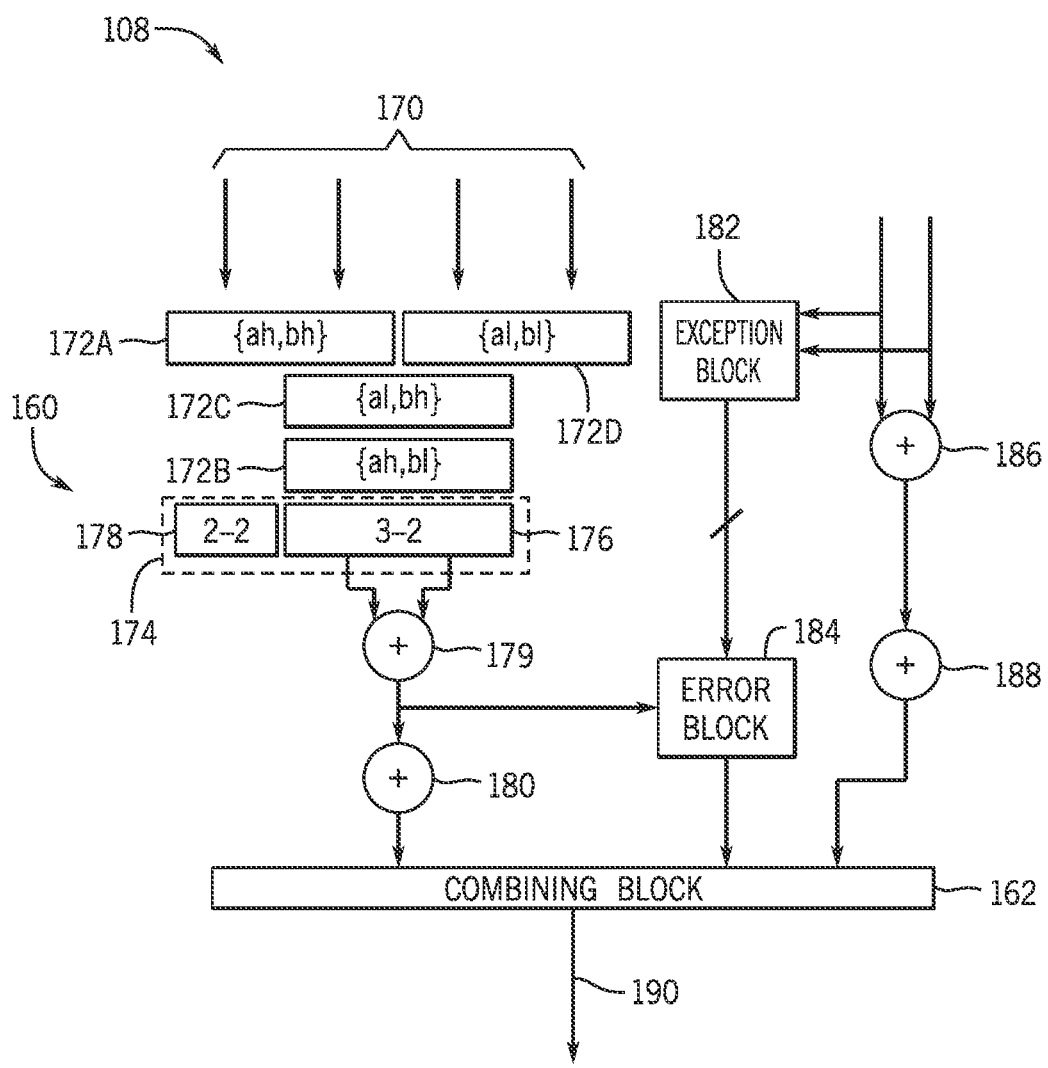
FIG. 5 is a block diagram of summation circuitry of the DSP block of FIG. 3, in accordance with an embodiment of the present disclosure.

The DSP block 26 may sum fixed-point and floating-point values using the summation block 108, which may include summation circuitry (e.g., adders, compressors, or a combination thereof) and a combining block 162. More specifically, the summation block 108 may be utilized to generate the product of double precision floating-point operation by adding together subproducts generated by the multipliers 104. FIG. 5 illustrates an example embodiment of the summation block 108, which will be discussed with respect to the example introduced above in which a first FP64 value is multiplied by a second FP64 value. The summation block 108 may receive, via inputs 170, subproducts 172 (e.g., subproducts 172A, 172B, 172C, 172D) generated by the multipliers 104. For example, subproduct 172A may be a subproduct generated from multiplying the upper halves of the two FP64 values, subproduct 172B may be a subproduct generated from multiplying the upper half of the first FP64 value by the lower half of the second FP64 value, subproduct 172C may be a subproduct generated from multiplying the upper half of the second FP64 value by the lower half of the first FP64 value, and subproduct 172D may be a subproduct generated from multiplying the lower halves of the two FP64 values. As illustrated, the subproducts 172A, 172B, 172C may be shifted (e.g., left-shifted) to account for being more significant than the subproduct 174D. The subproducts 172 (as shifted) may be compressed using compressor circuitry 174, which may include a 3-2 compressor 176 and a 2-2 compressor 178. The compressor circuitry 174 may generate two outputs and provide the outputs to a carry propagate adder (CPA) 179. The CPA adder 179 may sum the two received values and output a value to an additional CPA adder 180 that performs rounding. In some embodiments, a propagation network may be used instead of the additional CPA adder 180 to increase computational speed and reduce physical space utilized. Accordingly, when performing double precision floating-point multiplication operations, the summation block 108 may receive the integer subproduct outputs from the multipliers 104 (e.g., subproducts 172) and sum the subproducts 172.

The summation circuitry 108 may also include an exception block 182, error block 184, adder 186, and adder 188, which may be utilized to perform operations associated with the exponent bits of the double precision floating-point values being multiplied. The exception block 182 and error block 184 may respectively perform similar, or the same, operations that the input exception block 124 and error block 128 perform. Furthermore, adder 186 and adder 188 may respectively perform similar, or the same, operations that the adder 136 and the adder 132 perform. For example, the multiplexer network 102 may route the exponent bits of two FP64 values being multiplied to the adder 186, which may generate a sum of the exponent bits. Combining block 162 may operate in a manner generally similar to that of the exception block 134. For instance, the combining block 162 may combine outputs from the CPA 180, the error block 184, and the adder 188 to yield a product (e.g., a FP64 value) that may be output via an output 190. Accordingly, the DSP block 26 may perform operations involving exponent bits of floating-point values when performing the final operation (e.g., summation) of integer values used to generate the product of two values being multiplied. Indeed, as discussed above, when performing single precision floating-point multiplication, the exponent bits of the values being multiplied may be handled by a multiplier 104, which may perform the final operation on integer values when the core multiplier 118 generates a product (e.g., an integer value corresponding to the mantissa bits of an FP32 value to be generated). Conversely, as also described above, when performing double precision floating-point multiplication, the exponent bits of the values being multiplied (e.g., two FP64 values) may be operated on by the summation block 108, which also sums the integer subproducts 172.

Returning to FIG. 3, the summation block 110 may be utilized to add a sum (e.g., an FP64 value or an integer value) generated by the summation block 108 with a value produced by another DSP block that is communicatively coupled to the DSP block 26. In other words, the summation block 110 may be utilized to add two FP64 values, floating-point values having lower precisions than FP64 values, or integers. As another example, the summation block 110 may be utilized to add a value generated by the summation block 108 and a value that is read in from a register (e.g., register block 113). The outputs of the integer combining block 106, adders 107, summation block 108, and summation block 110 may be provided the multiplexer network 112, which may route received values to the register block 113 for storage or to the output 114.

Figure 6:
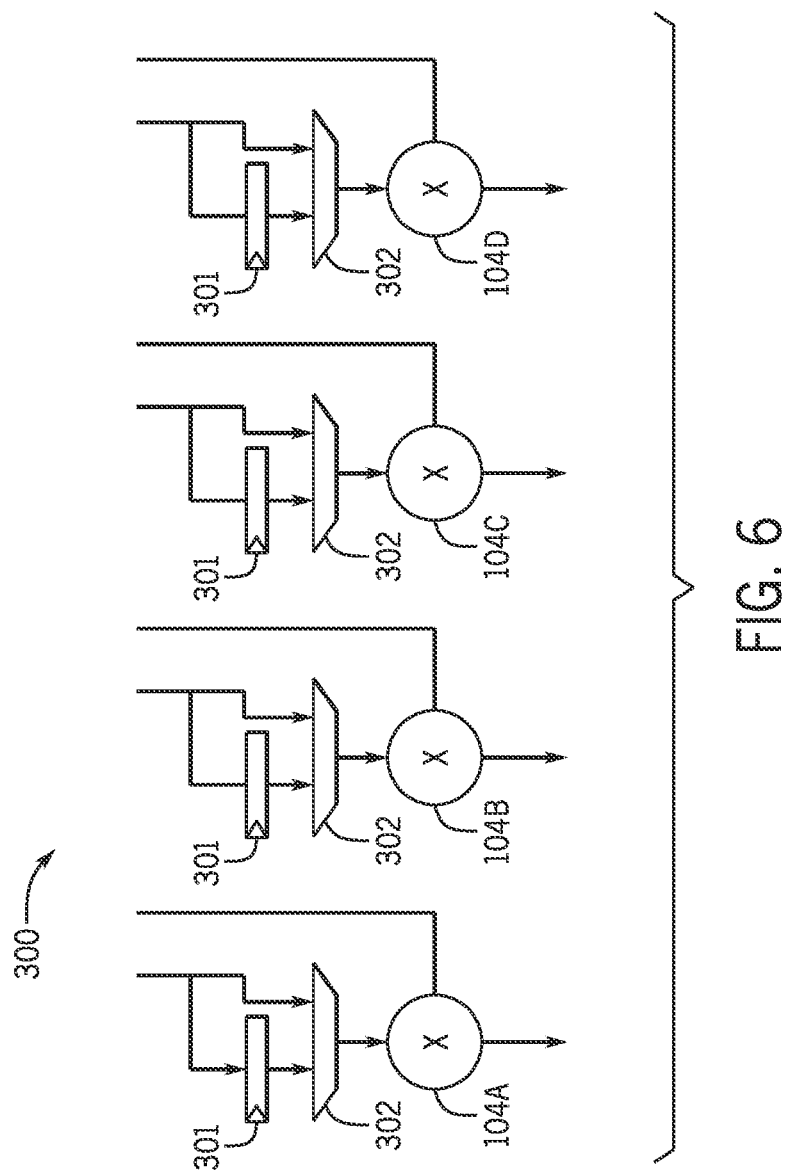
FIG. 6 is a block diagram of a staging structure that includes one or more staging registers, in accordance with an embodiment of the present disclosure.

Continuing with the drawings, FIG. 6 illustrates a staging structure 300 which may be implemented in the DSP block 26, for example, to enable the multipliers 104 of the DSP block 26 to operate simultaneously when performing certain multiplication operations. For instance, because there are four multipliers 104 included in the DSP block 26 and each of the four multipliers 104 may perform INT28 multiplication, a maximum of 224 input wires may be needed to simultaneously provide eight INT28 inputs to the multipliers 104. However, as discussed above, the input 100 may include fewer wires (e.g., 128 input wires). To implement INT28 multiplication at each of the four multipliers 104 simultaneously, a set of coefficients may be loaded into staging registers 301 such that the set of coefficients may be re-used as one of the input vectors into the multipliers 104. In other words, the multipliers 104 may each receive an input from a staging register 301 and via the input 100 and perform a multiplication operation involving the two received values.

In some embodiments, a set of inputs to the multipliers 104 may be latched to the staging registers 301. Additionally, the staging structure 300 includes multiplexers 302, which may select whether a registered value or a received value is provided to a corresponding multiplier 104. The multiplexer 302 may form a portion of the multiplexer network 102 or be separate from the multiplexer network 102. Furthermore, it should be noted that, in some instances, the core multiplier 118 may directly receive the set of inputs (e.g., via input 100), and the staging registers 301 and the multiplexers 302 may be unused. Additionally, it should be appreciated that the staging registers 301 may be used for both integer and floating-point values.

Figure 7:
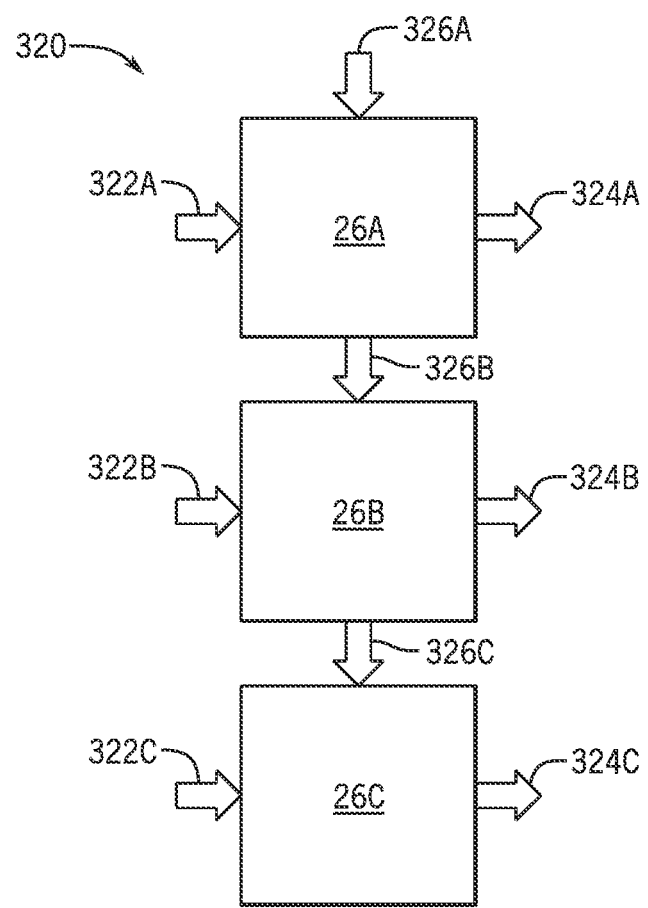
FIG. 7 is a block diagram of system that includes DSP blocks with data being cascaded between the DSP blocks, in accordance with an embodiment of the present disclosure.

FIG. 7 illustrates system 320 which may be implemented on the integrated circuit device 12. In particular, the system includes three DSP blocks 26 (e.g., DSP blocks 26A, 26B, 26C) that are communicatively coupled to one another. More specifically, the DSP blocks 26 may be chained together to cascade data from one DSP block 26 to the next. For example, each of the DSP blocks 26 may receive an input 322 (e.g., two or more values to be multiplied), generate an output 324, which may a product generated by multiplying values included in the input 322. The DSP blocks 26 may also receive inputs 326, which are outputs generated from DSP blocks 26 that are positioned further upstream in the chain of cascaded DSP block 26 of the system 320. The DSP blocks 26 may perform a function involving the inputs 326, such as adding the inputs 326 to the product generated from the input 322, to generate an output that serves as the input 326 for the subsequent DSP block 26 in the chain. In any case, the outputs 324 and inputs 326 may both be a product generated by DSP block 26 or a sum generated by adding a product and a value received from another DSP block 26. The cascaded DSP blocks 26 may be applied in certain processes (e.g., FIR filtering) to increase system efficiency.

Figure 8:
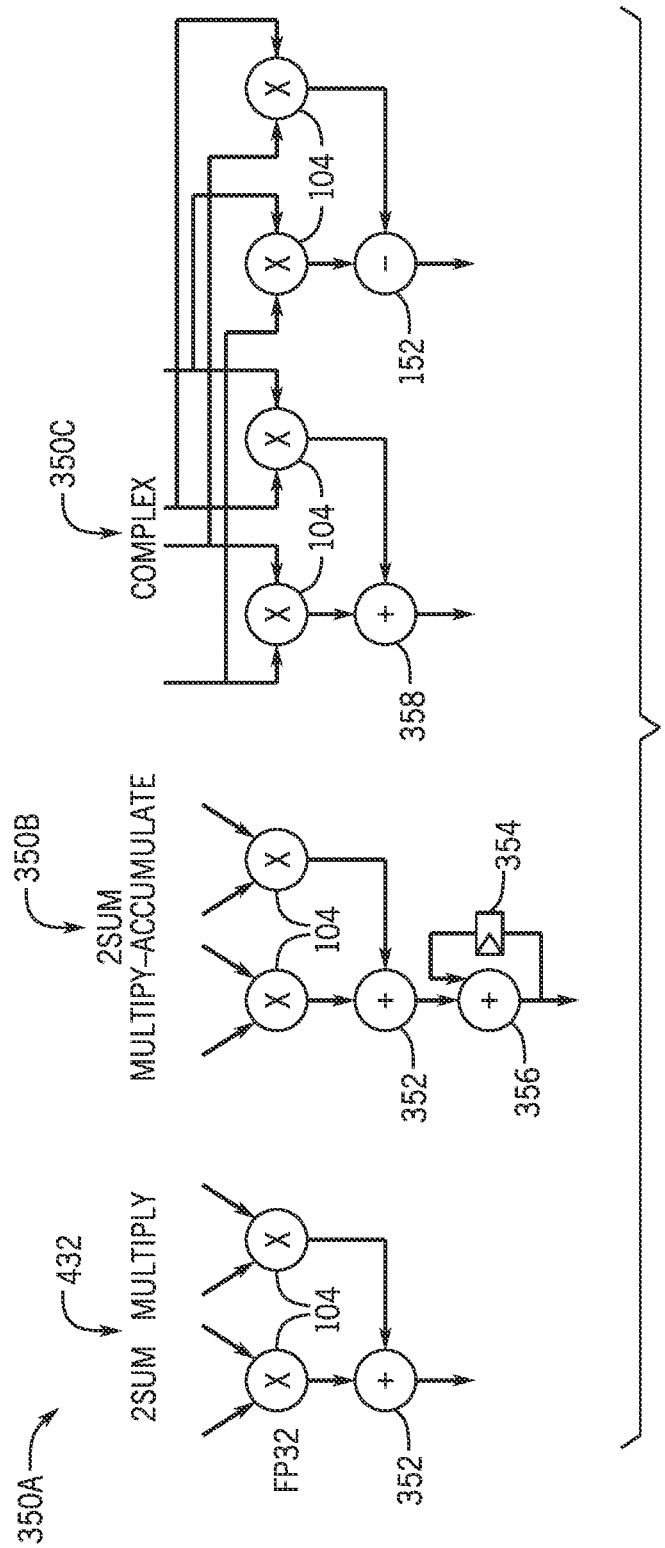
FIG. 8 is a block diagram of various FP32 modes implementable by the DSP block of FIG. 3, in accordance with an embodiment of the present disclosure.
Figure 9:
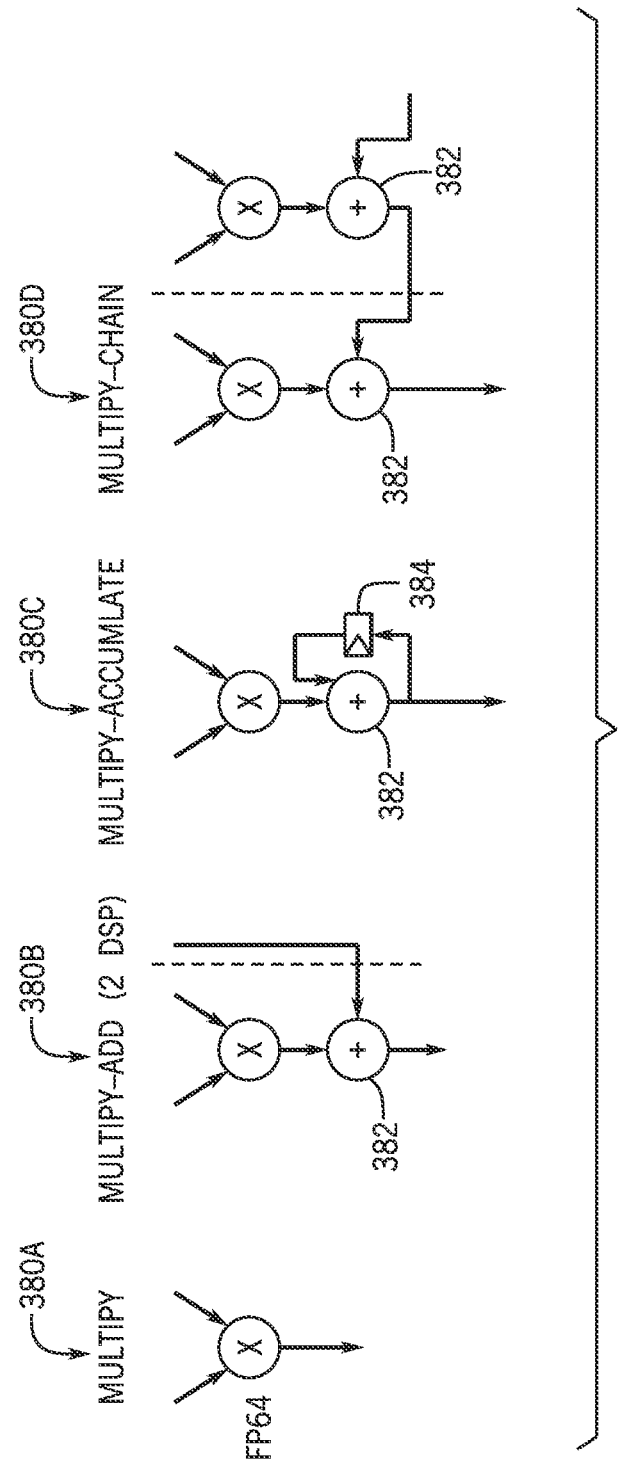
FIG. 9 is a block diagram of various FP64 modes implementable by the DSP block of FIG. 3, in accordance with an embodiment of the present disclosure.

Continuing with the drawings, FIG. 8 and FIG. 9 illustrate various operations that the DSP block 26 (or multiple DSP blocks 26) may perform. In particular, FIG. 8 illustrates modes 350 (e.g., modes 350A, 350B, 350C) of operation that may be employed by a single DSP block 26, for example, when operating on single precision floating-point values (FP32 values). The modes 350 may also be employed when operating on integer values (e.g., INT16 values or other integer values having fewer than sixteen bits).

The first mode of operation, mode 350A, is a two-sum multiply operation in which two FP32×FP32 products are determined (e.g., each product generated by a single one of the multipliers 104), and the products may be summed using an adder 352, which may be one of the adders 107. The adder 352 may output a sum, which may be utilized by other components of the DSP block 26 or output from the DSP block 26.

The second mode of operations, mode 350B, is a two-sum multiply-accumulate operation that is generally similar to the two-sum multiply operation described in the preceding paragraph except that the sum generated by the adder 352 may be added to a value (e.g., a previously determined sum) stored in a register 354 using an adder 356, which may be included in the DSP block 26A.

The DSP block 26 may also perform complex operations, which is mode 350C. In the mode 350C, each of the multipliers 104 (or, more specifically, each of the core multipliers 118) receives two FP32 inputs and generates a product. To create a complex output value, the outputs from two of the multipliers 104 may be routed the adder 358 (which may be included in the summation circuitry 150), and the outputs from the other two multipliers 104 may be routed to the subtraction circuitry 152.

FIG. 9 illustrates several modes 380 (e.g., modes 380A, 380B, 380C, 380D) of operation that may be employed by one or more DSP blocks 26 on FP64 values or integer values (e.g., INT27 values or integer values having fewer than twenty-seven bits). Each of the modes 380 is discussed below with respect to FP64 values.

In mode 380A, which is a multiplication operation, a single DSP block 26 multiplies a first FP64 value by a second FP64 value. As described above, the DSP block 26 may perform this multiplication operation by generating smaller (e.g., less precise) values from the FP64 values, performing several multiplication operations using the multipliers 104 and the smaller values, and adding the subproducts generated by the multipliers 104 to generate the product of the two FP64 values (e.g., another FP64 value).

Mode 380B is a multiply-add mode which may be employed using two DSP blocks 26. In particular, a DSP block 26 may perform a multiplication operation to generate a product (e.g., as described above). The product may be received by an adder 382, which may also receive a value (e.g., a sum or product) output by another DSP block 26. The adder 382 may be implemented using the summation block 110, and the adder 382 may add the received values and generate a sum from the received values.

Mode 380C is a multiply-accumulate mode that may be implemented using a single DSP block 26. In the multiply-accumulate mode, a product generated by the DSP block (e.g., an FP64 value generated by multiplying two FP64 values may be added (using adder 382 that may be implemented using the summation block 110) may be added to a value stored in a register 384 to perform double-precision accumulation. The sum generated by the adder 382 may be stored in the register 384 and, in some instances, output by the DSP block 26.

Mode 380D is a multiply-chain mode that may be employed using two (or more) DSP blocks. In the multiply-chain mode, each DSP block 26 may receive two FP64 values, determine a product of the FP64 values, and add the product to a value received from a DSP block 26 located upstream in the chain of DSP blocks 26 using the adder 382 (which may be implemented using the summation block 110).

Figure 10:
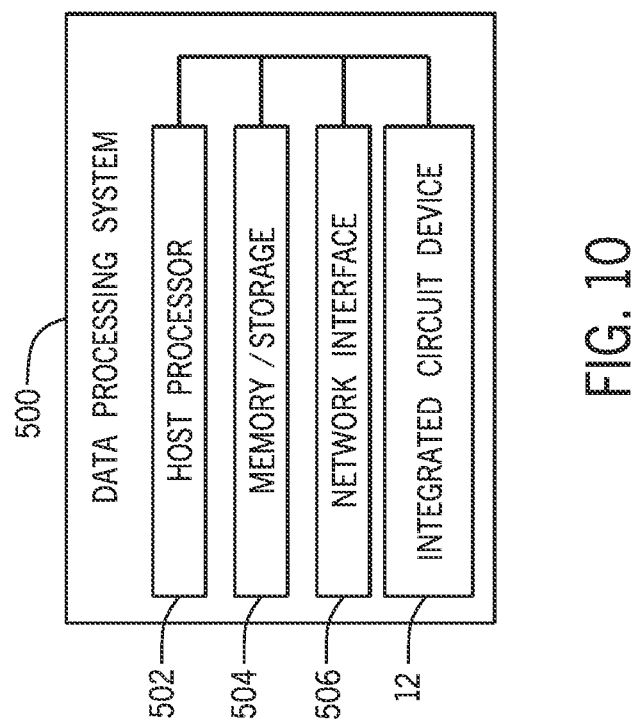
FIG. 10 is a block diagram of a data processing system where one or more floating-point multiplier rounding circuits may be implemented, in accordance with an embodiment.

The integrated circuit device 12 may be, or may be a component of, a data processing system, such as the data processing system 500, shown in FIG. 10. The data processing system 500 may include a host processor 502, memory and/or storage circuitry 504, and a network interface 506. The data processing system 500 may include more or fewer components (e.g., electronic display, user interface structures, or ASICs). The host processor 502 may include any suitable processor, such as an INTEL® Xeon® processor or a reduced-instruction processor (e.g., a reduced instruction set computer (RISC), or an Advanced RISC Machine (ARM) processor) that may manage a data processing request for the data processing system 500 (e.g., to perform machine learning, video processing, voice recognition, image recognition, data compression, database search ranking, bioinformatics, network security pattern identification, spatial navigation, or the like). The memory and/or storage circuitry 504 may include random access memory (RAM), read-only memory (ROM), one or more hard drives, flash memory, or the like. The memory and/or storage circuitry 504 may hold data to be processed by the data processing system 500. In some cases, the memory and/or storage circuitry 504 may also store configuration programs (bitstreams) for programming the integrated circuit device 12. The network interface 506 may allow the data processing system 500 to communicate with other electronic devices. The data processing system 500 may include several different packages or may be contained within a single package on a single package substrate.

In one example, the data processing system 500 may be part of a data center that processes a variety of different requests. For instance, the data processing system 500 may receive a data processing request via the network interface 506 to perform machine learning, video processing, voice recognition, image recognition, data compression, database search ranking, bioinformatics, network security pattern identification, spatial navigation, or some other specialized task. The host processor 502 may cause the programmable logic fabric of the integrated circuit device 12 to be programmed with a multiplier suitable to implement a requested task. For instance, the host processor 502 may instruct that a configuration data (bitstream) stored on the memory and/or storage circuitry 504 to be programmed into the programmable logic fabric of the integrated circuit device 12. The configuration data (bitstream) may represent a circuit design set to use one or more floating-point multipliers or other floating-point arithmetic operations that may be mapped to and packed together in the programmable logic according to the techniques described herein. By efficiently mapping and packing the floating-point multipliers, the area, latency, and/or routing resources used to perform the requested task may be reduced on the integrated circuit device 12.

Accordingly, the techniques discussed herein may enable double precision floating-point operations and fixed-point operations (e.g., multiplication, addition, accumulation) to performed using a single DSP block. More specifically, as discussed above, the DSP block may be utilized to perform multiplication involving double precision and single precision floating-point values as well as multiplication involving integer values. Furthermore, to perform multiplication operations involving double precision floating-point values, the DSP block may generate smaller precision values from the received double precision floating-point values, perform several multiplication operations using the smaller precision values to generate subproducts, and add the subproducts together to generate the product of the multiplication operation involving the received double precision floating-point values.

While the embodiments set forth in the present disclosure may be susceptible to various modifications and alternative forms, specific embodiments have been shown by way of example in the drawings and have been described in detail herein. However, it may be understood that the disclosure is not intended to be limited to the particular forms disclosed. The disclosure is to cover all modifications, equivalents, and alternatives falling within the spirit and scope of the disclosure as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

Example Embodiments of the Disclosure

The following numbered clauses define certain example embodiments of the present disclosure.

CLAUSE 1.
A digital signal processing (DSP) block comprising:
a plurality of multipliers; and
a summation block separate from the plurality of multipliers, wherein:
the DSP block is configurable to perform a first multiplication operation to determine a first product of a first floating-point value and a second floating-point value using only a first multiplier of the plurality of multipliers; and
the DSP block is configurable to perform a second multiplication operation between a third floating-point value and a fourth floating-point value by:
receiving, at each of the plurality of multipliers, two integer values generated from the third floating-point value and the fourth floating-point value;
generating, via the plurality of multipliers, a plurality of subproducts by multiplying, at each of the multipliers, the two integer values; and
generating a second product of the second multiplication operation by adding, via the summation block, the plurality of subproducts.

CLAUSE 2.
The DSP block of clause 1, wherein:
the first floating-point value and the second floating-point value are single precision floating-point values; and
the third floating-point value and the fourth floating-point value are double precision floating-point values.

CLAUSE 3.
The DSP block of clause 2, comprising a multiplexer network configurable to route the two values to each of the multipliers of the plurality of multipliers.

CLAUSE 4.
The DSP block of clause 3, wherein:
the plurality of multipliers comprises:
a first multiplier configurable to:
receive a first upper half of the third floating-point value and a second upper half of the fourth floating-point value; and
generate a first subproduct of the plurality of subproducts by multiplying the first upper half and the second upper half;
a second multiplier configurable to:
receive a first lower half of the third floating-point value and the second upper half of the fourth floating-point value; and
generate a second subproduct of the plurality of subproducts by multiplying the first lower half and the second upper half;
a third multiplier configurable to:
receive the first upper half of the third floating-point value and a second lower half of the fourth floating-point value; and
generate a third subproduct of the plurality of subproducts by multiplying the first upper half and the second lower half; and
a fourth multiplier configurable to:
receive the first lower half of the third floating-point value and the second lower half of the fourth floating-point value; and
generate a fourth subproduct of the plurality of subproducts by multiplying the first lower half and the second lower half.

CLAUSE 5.
The DSP block of clause 2, wherein the DSP block is configurable to generate the second product of the second multiplication operation by:
adding, via the summation block, first exponent bits of the third floating-point value and second exponent bits of the fourth floating-point value to generate a first sum; and
generating a floating-point value based on a sum of the plurality of subproducts and the first sum.

CLAUSE 6.
The DSP block of clause 1, wherein the DSP block is configurable to perform complex math operations involving eight values that are each less precise than the third floating-point value and the fourth floating-point value.

CLAUSE 7.
The DSP block of clause 1, comprising:
a register configurable to store a third product; and
a second summation block configurable to:
generate a sum by adding the second product and the third product; and
send the sum to the register for storage.

CLAUSE 8.
The DSP block of clause 1, wherein the DSP block is configurable to:
receive an output of a second DSP block that is communicatively coupled to the DSP block; and
add, using a second summation block of the DSP block, the second product and the output received from the second DSP block.

CLAUSE 9.
The DSP block of clause 1, wherein the DSP block is included within a field-programmable gate array (FPGA).

CLAUSE 10.
S
An integrated circuit device comprising a digital signal processing (DSP) block, wherein the DSP block comprises:
a plurality of multipliers; and
a summation block separate from the plurality of multipliers, wherein:
the DSP block is configurable to perform a first multiplication operation to determine a first product of a first floating-point value and a second floating-point value using only a first multiplier of the plurality of multipliers; and
the DSP block is configurable to perform a second multiplication operation between a third floating-point value and a fourth floating-point value by:
receiving, at each of the plurality of multipliers, two integer values generated from the third floating-point value and the fourth floating-point value;
generating, via the plurality of multipliers, a plurality of subproducts by multiplying, at each of the multipliers, the two integer values;
receiving, at the summation block, the plurality of subproducts, first exponent bits of the third floating-point value, and second exponent bits of the fourth floating-point value;
generating, via the summation block, a first sum by adding the plurality of subproducts;
generating, via the summation block, a second sum by adding the first exponent bits and the second exponent bits; and generating a second product of the second multiplication operation based on the first sum and the second sum.

CLAUSE 11.

The integrated circuit device of clause 10, wherein the DSP block is configurable to perform the first product by:
receiving, at the first multiplier, first mantissa bits of the first floating-point value, second mantissa bits of the second floating-point value, third exponent bits of the first floating-point value, and fourth exponent bits of the second floating-point value;
generating, using multiplier circuitry of the first multiplier, a third product based on the first mantissa bits of the first floating-point value and the second mantissa bits of the second floating-point value;
generating, using adder circuitry of the first multiplier, a third sum by adding the third exponent bits and the fourth exponent bits; and
generating the first product based on the third product and the third sum.

CLAUSE 12.

The integrated circuit device of clause 10, the DSP block comprises a multiplexer network configurable to:
generate the two integer values from the third floating-point value and the fourth floating-point value; and
route the two integer values to the plurality of multipliers.

CLAUSE 13.

The integrated circuit device of clause 10, wherein the summation block comprises a combining block configurable to generate the second product.

CLAUSE 14.

The integrated circuit device of clause 10, wherein the DSP block is configurable to perform multiplication operations involving fixed-point values.

CLAUSE 15.

The integrated circuit device of clause 10, comprising a second DSP block communicatively coupled to the DSP block, wherein the DSP block is configurable to:
receive an output of the second DSP block; and
add, using a second summation block of the DSP block, the second product and the output received from the second DSP block.

CLAUSE 16.

The integrated circuit device of clause 15, wherein the output of the second DSP block comprises a double precision floating-point value generated by the second DSP block by performing a third multiplication operation between a fifth double precision floating-point value and a sixth double precision floating-point value.

CLAUSE 17.

The integrated circuit device of clause 10, wherein the plurality of multipliers is configurable to simultaneously perform multiplication involving a first number of bits, wherein the first number of bits is greater than a number of bits the DSP block is configurable to receive in a single clock cycle.

CLAUSE 18.

A system comprising:
an integrated circuit device; and
a programmable logic device communicatively coupled to the integrated circuit device, wherein the programmable logic device comprises a digital signal processing (DSP) block that comprises:
a plurality of multipliers; and
a summation block separate from the plurality of multipliers, wherein:
the DSP block is configurable to perform a first multiplication operation to determine a first product of a first floating-point value and a second floating-point value using only a first multiplier of the plurality of multipliers; and
the DSP block is configurable to perform a second multiplication operation between a third floating-point value and a fourth floating-point value by:
receiving, at each of the plurality of multipliers, two integer values generated from the third floating-point value and the fourth floating-point value;
generating, via the plurality of multipliers, a plurality of subproducts by multiplying, at each of the multipliers, the two integer values;
receiving, at the summation block, the plurality of subproducts, first exponent bits of the third floating-point value, and second exponent bits of the fourth floating-point value;
generating, via the summation block, a first sum by adding the plurality of subproducts;
generating, via the summation block, a second sum by adding the first exponent bits and the second exponent bits; and
generating a second product of the second multiplication operation based on the first sum and the second sum.

CLAUSE 19.

The system of clause 18, comprising a substrate, wherein the integrated circuit device and the programmable logic device are mounted on the substrate.

CLAUSE 20.

The system of clause 19, wherein the programmable logic device comprises a field-programmable gate array (FPGA).

What is claimed is:

1. A digital signal processing (DSP) block comprising:
a plurality of multipliers; and
a summation block separate from the plurality of multipliers, wherein:
the DSP block is configurable to perform a first multiplication operation to determine a first product of a first floating-point value and a second floating-point value using only a first multiplier of the plurality of multipliers; and
the DSP block is configurable to perform a second multiplication operation between a third floating-point value and a fourth floating-point value by:
receiving, at each of the plurality of multipliers, two integer values generated from the third floating-point value and the fourth floating-point value;
generating, via the plurality of multipliers, a plurality of subproducts by multiplying, at each of the multipliers, the two integer values; and
generating a second product of the second multiplication operation by adding, via the summation block, the plurality of subproducts.

2. The DSP block of claim 1, wherein:
the first floating-point value and the second floating-point value are single precision floating-point values; and
the third floating-point value and the fourth floating-point value are double precision floating-point values.

3. The DSP block of claim 2, comprising a multiplexer network configurable to route the two values to each of the multipliers of the plurality of multipliers.

4. The DSP block of claim 3, wherein:
the plurality of multipliers comprises:
a first multiplier configurable to:

receive a first upper half of the third floating-point value and a second upper half of the fourth floating-point value; and generate a first subproduct of the plurality of subproducts by multiplying the first upper half and the second upper half;

a second multiplier configurable to:

receive a first lower half of the third floating-point value and the second upper half of the fourth floating-point value; and generate a second subproduct of the plurality of subproducts by multiplying the first lower half and the second upper half;

a third multiplier configurable to:

receive the first upper half of the third floating-point value and a second lower half of the fourth floating-point value; and generate a third subproduct of the plurality of subproducts by multiplying the first upper half and the second lower half; and a fourth multiplier configurable to:

receive the first lower half of the third floating-point value and the second lower half of the fourth floating-point value; and generate a fourth subproduct of the plurality of subproducts by multiplying the first lower half and the second lower half.

5. The DSP block of claim 2, wherein the DSP block is configurable to generate the second product of the second multiplication operation by:

adding, via the summation block, first exponent bits of the third floating-point value and second exponent bits of the fourth floating-point value to generate a first sum; and generating a floating-point value based on a sum of the plurality of subproducts and the first sum.

6. The DSP block of claim 1, wherein the DSP block is configurable to perform complex math operations involving eight values that are each less precise than the third floating-point value and the fourth floating-point value.

7. The DSP block of claim 1, comprising:

a register configurable to store a third product; and a second summation block configurable to:

generate a sum by adding the second product and the third product; and send the sum to the register for storage.

8. The DSP block of claim 1, wherein the DSP block is configurable to:

receive an output of a second DSP block that is communicatively coupled to the DSP block; and add, using second summation block of the DSP block, the second product and the output received from the second DSP block.

9. The DSP block of claim 1, wherein the DSP block is included within a field-programmable gate array (FPGA).

10. An integrated circuit device comprising a digital signal processing (DSP) block, wherein the DSP block comprises:

a plurality of multipliers; and a summation block separate from the plurality of multipliers, wherein:

the DSP block is configurable to perform a first multiplication operation to determine a first product of a first floating-point value and a second floating-point value using only a first multiplier of the plurality of multipliers; and the DSP block is configurable to perform a second multiplication operation between a third floating-point value and a fourth floating-point value by:

receiving, at each of the plurality of multipliers, two integer values generated from the third floating-point value and the fourth floating-point value;

generating, via the plurality of multipliers, a plurality of subproducts by multiplying, at each of the multipliers, the two integer values;

receiving, at the summation block, the plurality of subproducts, first exponent bits of the third floating-point value, and second exponent bits of the fourth floating-point value;

generating, via the summation block, a first sum by adding the plurality of subproducts;

generating, via the summation block, a second sum by adding the first exponent bits and the second exponent bits; and generating a second product of the second multiplication operation based on the first sum and the second sum.

11. The integrated circuit device of claim 10, wherein the DSP block is configurable to perform the first product by:

receiving, at the first multiplier, first mantissa bits of the first floating-point value, second mantissa bits of the second floating-point value, third exponent bits of the first floating-point value, and fourth exponent bits of the second floating-point value;

generating, using multiplier circuitry of the first multiplier, a third product based on the first mantissa bits of the first floating-point value and the second mantissa bits of the second floating-point value;

generating, using adder circuitry of the first multiplier, a third sum by adding the third exponent bits and the fourth exponent bits; and generating the first product based on the third product and the third sum.

12. The integrated circuit device of claim 10, the DSP block comprises a multiplexer network configurable to:

generate the two integer values from the third floating-point value and the fourth floating-point value; and route the two integer values to the plurality of multipliers.

13. The integrated circuit device of claim 10, wherein the summation block comprises a combining block configurable to generate the second product.

14. The integrated circuit device of claim 10, wherein the DSP block is configurable to perform multiplication operations involving fixed-point values.

15. The integrated circuit device of claim 10, comprising a second DSP block communicatively coupled to the DSP block, wherein the DSP block is configurable to:

receive an output of the second DSP block; and add, using a second summation block of the DSP block, the second product and the output received from the second DSP block.

16. The integrated circuit device of claim 15, wherein the output of the second DSP block comprises a double precision floating-point value generated by the second DSP block by performing a third multiplication operation between a fifth double precision floating-point value and a sixth double precision floating-point value.

17. The integrated circuit device of claim 10, wherein the plurality of multipliers is configurable to simultaneously perform multiplication involving a first number of bits, wherein the first number of bits is greater than a number of bits the DSP block is configurable to receive in a single clock cycle.

18. A system comprising:

an integrated circuit device; and a programmable logic device communicatively coupled to the integrated circuit device, wherein the programmable logic device comprises a digital signal processing (DSP) block that comprises:

a plurality of multipliers; and a summation block separate from the plurality of multipliers, wherein:

the DSP block is configurable to perform a first multiplication operation to determine a first product of a first floating-point value and a second floating-point value using only a first multiplier of the plurality of multipliers; and the DSP block is configurable to perform a second multiplication operation between a third floating-point value and a fourth floating-point value by:

receiving, at each of the plurality of multipliers, two integer values generated from the third floating-point value and the fourth floating-point value;

generating, via the plurality of multipliers, a plurality of subproducts by multiplying, at each of the multipliers, the two integer values;

receiving, at the summation block, the plurality of subproducts, first exponent bits of the third floating-point value, and second exponent bits of the fourth floating-point value;

generating, via the summation block, a first sum by adding the plurality of subproducts;

generating, via the summation block, a second sum by adding the first exponent bits and the second exponent bits; and generating a second product of the second multiplication operation based on the first sum and the second sum.

19. The system of claim 18, comprising a substrate, wherein the integrated circuit device and the programmable logic device are mounted on the substrate.

20. The system of claim 19, wherein the programmable logic device comprises a field-programmable gate array (FPGA).

* * * * *